May 17, 1966 J. M. OHNO 3,251,128
METHOD OF APPLYING A LOW RESISTANCE CONTACT TO A BUS
Filed June 18, 1963
Inventor
John M. Ohno
By Donald C. McGaughey
Attorney 3,251,128

METHOD OF APPLYING A LOW RESISTANCE CONTACT TO A BUS

John M. Ohno, Seattle, Wash., assignor to Allis-Chalmers Manufacturing Company, Milwaukee, Wis.
Filed June 18, 1963, Ser. No. 288,772
4 Claims. (Cl. 29—488)

This invention relates generally to a method of plating aluminum with silver, and more particularly to a method of hot pressing silver plated copper foil or sheet onto aluminum articles.

Aluminum is a desirable material for structural components because its low specific gravity permits approximately three times as many components to be produced from the same weight of material as most other common base metals. This factor, plus the total overall weight reduction, has encouraged the exploitation of the possibility of replacing the heavier base metals of construction with aluminum and aluminum alloys. A particularly desirable area of investigation has been the field of bus bars for electrical conduction where the substitution of aluminum bus conductors for copper bus conductors had achieved wide commercial success. Because the alumnium bus industry is by far the largest industry utilizing plated aluminum the production of aluminum bus conductors will be used herein to exemplify this invention.

The replacement of copper bus with aluminum bus poses many problems. Namely, the ever present oxide film on aluminum surfaces is not conductive and thus the contact resistance across a bare aluminum surface is quite substantial. Under service conditions where the bus may become heated, the oxide film may grow and greatly increase the already substantial contact resistance. If the oxide film is removed, a new film will immediately replace it as soon as the aluminum surface is exposed to the atmosphere.

The most promising approach in overcoming this problem of contact resistance has been to electroplate the aluminum with silver, which has a very low contact resistance. The corrosion products which may form on the surface of silver, such as oxides and sulfides, are good electrical conductors in themselves in contrast with the oxides of aluminum and copper, and further, these corrosion products of silver proceed to reenhance electrical conductivity of the bus in service because they tend to reduce to the base metal at elevated temperatures. Thus the silver surface tends to maintain itself in the metallic state during the heat cycling of service.

Still, however, the problems are not eliminated as aluminum does not readily lend itself to electroplating. The main reason for this is again aluminum's great affinity for oxygen and to the ever present oxide film on aluminum surfaces, since the oxide film works against the desired adhesion of the plated deposit. As noted above, this film could be removed, but a new film would be formed as soon as the surface was exposed to the atmosphere. Another problem stems from the fact that quality silver plate will not remain in contact with aluminum at elevated temperatures because the aluminum, if heated for substantial lengths of time, will "bleed" through the silver plate. Therefore, for bus applications it is necessary to first undergo extensive washing and cleaning procedures to remove any oxide film from the surface of the aluminum. Then the aluminum must be plated with an intermediate metal, also having good electrical conduction properties such as copper, to prevent direct contact between the aluminum and the silver. And finally the silver must be electroplated onto the intermediate metal.

It is quite apparent that the electroplating techniques for aluminum bus are elaborate and complex, since the oxide film must first be removed and then prevented from reforming while the copper plate is being deposited. Some of these procedures require a series of washes and rinses and copper strikes, while others proceed to plate under a vacuum after the aluminum is cleansed of the oxide film. By still other methods, the deleterious oxide film is converted to a useful surface, as in anodic oxidation where a porous coating is created to which the plate is mechanically anchored. By any of these processes however, the process is lengthy, cumbersome and complex. These procedures have the further disadvantages in that the consumption of silver is high despite the lengthy procedures of masking off the bus where the silver plate is not necessary.

This invention is predicated upon the discovery that a copper foil or sheet, which is plated on one side with silver, may be easily and quickly hot pressed onto an aluminum or aluminum alloy surface. The resulting bond is mechanical in nature and is due to a slight metal flow in the abutting surfaces. This metal flow, into and around the irregularities of the opposing surface, results in a diffusion or recrystallization bonding or weld. The time involved is of a much shorter duration so that considerable expense is avoided by reducing the time for which the close atmosphere controls must be maintained, and reducing the overall time consumed in the complex electroplating procedures.

Accordingly, it is an object of this invention to provide a quick and inexpensive method of producing aluminum bus having silver contact surfaces.

It is another object of this invention to provide a process whereby copper foil or sheet having a silver plated outer surface may be hot pressed onto aluminum or aluminum alloys.

It is still another object of this invention to provide a process for producing aluminum bus having silver contact surfaces whereby the complex surface cleaning and electroplating techniques are avoided.

These and other objects and advantages of this invention shall hereinafter become apparent from a full understanding of the following description especially when considered in conjunction with the accompanying figure which is a photomicrograph showing a cross section through a bonded surface made in accordance with the invention.

In a preferred practice of the present invention copper must first be obtained in either a foil or sheet form. The copper foil or sheet is then plated on one side with silver to any desired thickness in accordance with any of the usual plating techniques. Since copper surfaces readily lend themselves to electroplating with silver, the art therefore is old and well known and need not be described in detail here. Published examples of silver plating onto copper may be found in Metal Finishing Guide Book Director for 1963, page 368, "Ag Plating," by L. L. Greenspan, published by Metal Finishing Company. Any of the known methods of silver plating copper surfaces may be employed assuring that the plate is deposited only on one side of the copper foil or sheet.

One method found to insure that only one side of the foil is plated, is to mask or grease the side of the foil or sheet where there is to be no plating. The masking tape or grease must of course be waterproof and binding to such an extent that water or the plating electrolyte will not wash or erode them away. Another method may be to fold the foil tightly in half and taping the edges to prevent the electrolyte from seeping between the inner surfaces.

The thickness of the copper foil or sheet may be varied substantially. However, extremely thin foils would complicate the process because of the difficulty encountered in handling thinner foils. Thicker copper sheets would ease the handling problems, but would add to the total cost of the materials. Copper foil of about 1 to 5 mils in thickness was found to be the most satisfactory when considering both handling and cost, with a preferred thickness being about 2 mils.

The silver plate may be deposited to any desired thickness, but considering the cost of silver, and the time consumed in plating, the plate thickness should be kept to the minimum necessary. Thus it was learned that a plate of about 0.1 to 0.5 mils was quite satisfactory and proved to be sufficient to protect the surface of the copper and base aluminum for long periods of service time.

After the copper foil or sheet has been plated on one side and the reverse side cleaned of any grease, mask or corrosive film, it is then ready to be pressed onto the aluminum base metal. Before the foil can be pressed however, the aluminum surface must be free of any oxide layer. Any known method may be used for removing the oxide layer, such as washing with hydrochloric acid and rinsing with acetone. Even mechanical removal methods may be used such as abrading. It is important however that this removal be done under an inert atmosphere to prevent the reformation of an oxide surface as soon as the original oxide layer is removed.

When the oxide film has been removed from the aluminum bus, and while the bus is still in the inert atmosphere, the foil which was previously cut or punched to size and shape should be pressed onto the area to be covered. Of course it is not necessary that the entire bus be covered but only the contact areas as are normally plated as mentioned above. To achieve a good tight bond between the copper foil or sheet and the aluminum surface, a proper combination of pressure, temperature and time are very important. An example of optimum conditions might be as follows: cold pressing at room temperature at 48,000 p.s.i. for about 30 seconds, then hot pressing at 600° F. at 30,000 p.s.i. for about 2 to 3 minutes. Another example would be to cold press at room temperature at 30,000 p.s.i. for about 3 minutes and then hot pressing at temperatures up to 850° F. at reduced pressures to 22,000 p.s.i. for 2 to 15 minutes. Of course, numerous other combinations would work as well. For example, without changing the pressing time, higher pressures would be required for lower temperatures and vice versa. The ultimate limits of pressure will be determined by the composition of the aluminum base material, the pressing temperature used and the permissible deformation allowable. In a like manner the ultimate pressing temperature will be determined by the softening temperature of the aluminum base material, the pressing pressure and the allowable deformation. For most aluminum materials however, the highest permissible temperature will be about 850 to 900° F. with low pressing pressures. The highest permissible pressure will be about 48,000 p.s.i. at room temperature and successively lower pressures for higher temperatures. Softer materials however, would necessitate lower pressures and the lower softening point materials would require lower temperatures. For critical parts where distortion must be kept to a minimum both the pressure and temperature can be reduced while the pressing time is increased. However, for most applications where the base material is commercially pure aluminum and where dimensions are not particularly critical, the above mentioned pressing conditions should prove quite satisfactory.

When the pressing operation is complete, the aluminum bus may be removed from the inert atmosphere and used as desired. The covering will be comparable to electroplated materials for many applications and even superior to electroplated bus for other applications. For example, the pressure bonded materials of this invention will usually have longer life at elevated temperatures because the intermediate plating for conventional bus is usually quite thin and thus is unable to prevent excessive diffusion at elevated temperatures.

Other embodiments of this invention could be derived by finding alternate methods for depositing the silver onto the copper. For example, silver foil and copper foil could be roll pressed together and then bonded to the aluminum in accordance with this teaching. Or it may even be possible to press silver foil onto copper foil as the copper foil is being pressed onto the aluminum.

To aid in a fuller understanding of this invention the following examples are presented as possible procedures that may be taken. These examples are merely exemplary and are not intended to limit the scope of this invention.

*Example I*

A piece of 2 mil copper foil was plated on one side with silver to a thickness of 0.2 mil. After plating, both outer surfaces of the foil were boiled for 10 to 15 minutes in a solution of 10 percent NaCN and then rinsed with hot water. The plated foil was then dipped in a solution of 33.3 percent $HNO_3$ for a few seconds and then rinsed with water. The foil was then rinsed with water. The foil was then rinsed in methyl alcohol, then in acetone and dried in an atmosphere of $N_2$ and stored in $N_2$ until ready for use. A bar of metallic aluminum (2 EC) was polished on one face and rinsed for one minute in a solution of 15 percent HCl and dried in an inert atmosphere. The silver plated copper foil was then placed on the cleaned aluminum surface while still under an inert atmosphere (copper side against the aluminum) and the layered structure placed in a hydraulic press. A pressure of 48,000 p.s.i. was applied for about 2 minutes. The pressing pressure was reduced to 30,000 p.s.i. as heating was commenced. The temperature of the bond was taken to about 640° F. over a period of about 10 minutes and then the pressure was reduced and the unit cooled. The resulting bond was excellent and is shown in the figure.

*Example II*

After cleaning procedures similar to that in Example I, 2.0 mil copper foil and 0.4 mil silver foil were placed on a clean aluminum (2 EC) surface under an inert atmosphere and pressed in a hydraulic press at an initial pressure of 40,000 p.s.i. for 30 seconds and then reduced to 30,000 p.s.i. as heating was commenced. As the sandwich structure heated to 750° F., the pressure was decreased to intervals until a final pressure of 24,800 p.s.i. was attained. This pressure was maintained for 2 minutes, released and the structure cooled. The resulting bond was excellent.

The embodiments of the invention in which an exclusive property or privilege is claimed are defined as follows:

1. The method of depositing a low resistance contact surface of silver onto an aluminum bus comprising the steps of:

(a) depositing silver onto one side only of a copper foil by electroplating means;

(b) removing any oxide film from the contact surface area of the aluminum bus while said bus is in an inert atmosphere;

(c) pressing the copper side of the silver plated copper foil onto the oxide free aluminum bus surface while said bus is still in the inert atmosphere, with a pressure of from 30,000 to 48,000 p.s.i., at room temperature for a period of from 30 seconds to 3 minutes;

(d) thereafter, pressing the said silver plated foil at a reduced pressure of from 22,000 to 30,000 p.s.i. and at an elevated temperature of from 600 to 850° F. for a period of from 2 to 15 minutes.

2. The method of claim 1 in which said copper foil is from 2 to 5 mils in thickness and said silver electroplated surface is from 0.1 to 0.5 mil in thickness.

3. The method of depositing a low resistance contact surface layer of silver onto aluminum bus contact areas comprising the steps of:

(a) covering one side of a copper foil having a thickness of about 3 mils with a masking material;

(b) electroplating silver onto the unmasked surface of said copper foil to a thickness of about 0.1 to 0.5 mils;

(c) cleaning said masking material and corrosion film from the copper surface of said copper foil after the said silver has been plated;

(d) removing any oxide film from the contact surface area of the aluminum bus while said bus is in an inert atmosphere;

(e) pressing the copper side of said silver plated foil onto the oxide free aluminum bus contact surface area while said bus is still in the inert atmosphere, with a pressure of about 30,000 to about 48,000 p.s.i. at room temperature for a period of about 30 seconds;

(f) thereafter heating the pressed area to a temperature not exceeding 900° F. and reducing the pressing pressure by 5,000–9,000 p.s.i. for every 200° F. rise in temperature;

(g) maintain the final pressure for a period of about 2 to 20 minutes; and (h) releasing the pressure and allowing the structure to cool to room temperature.

4. The method of claim 3 in which said copper foil is from 2 to 5 mils in thickness and said silver electroplated surface is from 0.1 to 0.5 mil in thickness.

References Cited by the Examiner

UNITED STATES PATENTS 2,790,656 4/1957 Cook.

JOHN F. CAMPBELL, *Primary Examiner.*